United States Patent
Lin et al.

(10) Patent No.: US 6,888,449 B2
(45) Date of Patent: May 3, 2005

(54) CIRCUITS FOR COUPLING SIGNALS CARRYING INFORMATION TO A TIRE PRESSURE MONITORING SYSTEM IN THE ABSENCE OF A RECEIVER

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 214 days.

(21) Appl. No.: 10/267,793

(22) Filed: Oct. 9, 2002

(65) Prior Publication Data

US 2004/0070494 A1 Apr. 15, 2004

(51) Int. Cl.$^7$ .......................... B60C 23/02; B60C 19/08; B60C 19/00; B60C 23/00; G08B 13/14
(52) U.S. Cl. ...................... 340/442; 340/443; 340/444; 340/445; 340/446; 340/447; 340/572.5; 73/146.5; 73/146.6; 73/146.7; 73/146.8; 152/152.1
(58) Field of Search ................................ 340/442–448, 340/572.5–8; 73/146.5–8; 152/152.1; 116/34 R, 34 A, 34 B

(56) References Cited

U.S. PATENT DOCUMENTS

| | | |
|---|---|---|
| 4,319,220 A | 3/1982 | Pappas et al. |
| 4,695,823 A | 9/1987 | Vernon |
| 5,274,355 A | 12/1993 | Galan |
| 5,585,554 A | 12/1996 | Handfield et al. |
| 5,853,020 A | 12/1998 | Widner |
| 5,987,980 A | 11/1999 | Mangafas et al. |
| 6,016,102 A | 1/2000 | Fortune et al. |
| 6,021,022 A | 2/2000 | Himes et al. |
| 6,161,905 A | 12/2000 | Hac et al. |
| 6,243,007 B1 * | 6/2001 | McLaughlin et al. ....... 340/447 |
| 6,257,289 B1 * | 7/2001 | Tomita et al. ........... 152/152.1 |
| 6,309,223 B1 | 10/2001 | Wolfe |
| 6,360,594 B1 | 3/2002 | Koch et al. |
| 6,369,703 B1 | 4/2002 | Lill |
| 6,371,178 B1 | 4/2002 | Wilson |
| 6,414,592 B1 * | 7/2002 | Dixit et al. ................. 340/447 |
| 6,481,806 B1 | 11/2002 | Krueger et al. |

OTHER PUBLICATIONS

RIN 2127–A133F Federal Motor Vehicle Safety Standards: Tire Pressure Monitoring Systems; Controls and Displays; Department of Transportation, National Highway Traffic Safety Administration, 49 CFR Part 571 (Docket No. NHTSA 2000–8572), www.nhtsa.dot.gov/cars/rules/ rulings/TirePressure/fedreg.htm), 45 pages.

* cited by examiner

*Primary Examiner*—Jeffery Hofsass
*Assistant Examiner*—Lam Pham
(74) *Attorney, Agent, or Firm*—Jimmy L. Funke

(57) ABSTRACT

Circuit and method for coupling signals to a tire pressure monitoring system assembled within the interior of a tire in the absence of a receiver are provided. The circuit comprises a coupling circuit that provides capacitance or electromagnetic coupling to pass an externally-derived stream of pulses to a microprocessor therein by either, in the case of capacitance coupling, connecting an external device that generates the stream of externally-derived of pulses to a valve stem of the tire and an electrical ground. In the case of electromagnetic coupling, by placing a suitable external device proximate the coupling circuit. The stream of pulses carries information usable by the microprocessor to perform a respective operational function.

32 Claims, 4 Drawing Sheets

CIRCUITS FOR COUPLING SIGNALS CARRYING INFORMATION TO A TIRE PRESSURE MONITORING SYSTEM IN THE ABSENCE OF A RECEIVER

BACKGROUND OF THE INVENTION

The present invention is generally related to sensing devices, and, more particularly, to tire pressure monitoring system and techniques for transmitting information to such a system in the interior of a tire from an external device.

A pressure sensor is one important component of a direct tire pressure monitoring system (TPMS), such as may be prescribed by governmental regulations. See, for example, 49 CFR Part 571, Titled "Federal Motor Vehicle Safety Standards: Tire Pressure Monitoring Systems; Controls and Displays". One basic configuration of a direct TPMS generally includes various components, such as a transmitter (not necessarily a transceiver, in order to reduce system costs) and a microprocessor that may be assembled within the interior of the tire. Most direct TPMSs are self-powered by a battery.

To reduce power consumption, the TPMS is commonly configured to operate within relatively long silent time intervals between transmissions. This type of operation with long silent time intervals between transmissions may create the following issues. Firstly, sensor test time may be unacceptably long due to the long silent interval between transmissions. Secondly, communications from an external source into the TPMS may be problematic since the transmitter is not generally designed to receive signals, but is designed just to transmit them. Communications from an external source or device may be useful for supplying various types of information to the TPMS, such as training the system to know sensor location in the vehicle, e.g., Front right, Front left, Rear right, Rear left, spare tire location, or performing calibration of the pressure sensing device, if optionally desired, etc. In view of the foregoing issues, it would be desirable to provide reliable and low-cost circuit and techniques that allow communicating information, for example, to the micro-processor of the TPMS for performing various operational functions, such as testing, calibration (if optionally desired), TPMS training, etc., without having to use an incrementally costlier device, such as a transceiver.

BRIEF SUMMARY OF THE INVENTION

Generally, the present invention fulfills the foregoing needs by providing in one aspect thereof, a tire pressure monitoring system connectable to a valve stem for supplying air to a respective tire. The system includes a pressure sensing device. The system further includes a printed circuit board. A microprocessor is mounted on the printed circuit board and is electrically connected to the pressure sensing device. A connector is provided to electrically connect the printed circuit board to a respective valve stem end disposed within the wheel. A circuit may be connected to the valve stem to pass an externally-derived stream of pulses to the microprocessor upon connecting, for example, respective leads from an external device that generates the stream of externally-derived pulses to the valve stem and an electrical ground. The circuit is completed by capacitive coupling between the printed circuit board ground plane and the metal wheel rim. The stream of pulses carries information usable by the microprocessor to perform a respective operational function.

The present invention further fulfils the foregoing needs by providing in another aspect thereof, a tire pressure monitoring system assembled within the interior of a tire and including a pressure sensing device. The system further includes a microprocessor electrically coupled to the pressure sensing device. A circuit is configured to provide electromagnetic coupling to pass an externally-derived stream of pulses to the processor upon an external device that generates the stream of externally-derived of pulses being placed proximate the circuit providing the electromagnetic coupling. The stream of pulses carries information usable by the microprocessor to perform a respective operational function.

In yet another aspect of the present invention, a circuit for coupling signals to a tire pressure monitoring system assembled within the interior of a tire in the absence of a receiver is provided. The circuit comprises a coupling circuit that provides capacitance coupling to pass an externally-derived stream of pulses to a microprocessor therein upon connecting respective leads from an external device that generates the stream of externally-derived pulses to a valve stem of the wheel and the metal wheel rim. The stream of pulses carries information usable by the microprocessor to perform a respective operational function.

In still another aspect of the invention, a circuit for coupling signals to a tire pressure monitoring system assembled within the interior of a tire in the absence of a receiver is provided. A coupling circuit is configured to provide electromagnetic coupling to pass an externally-derived stream of pulses to a processor therein upon an external device that generates the stream of externally-derived pulses being placed proximate the coupling circuit, the stream of pulses carrying information usable by the microprocessor to perform a respective operational function.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 6:
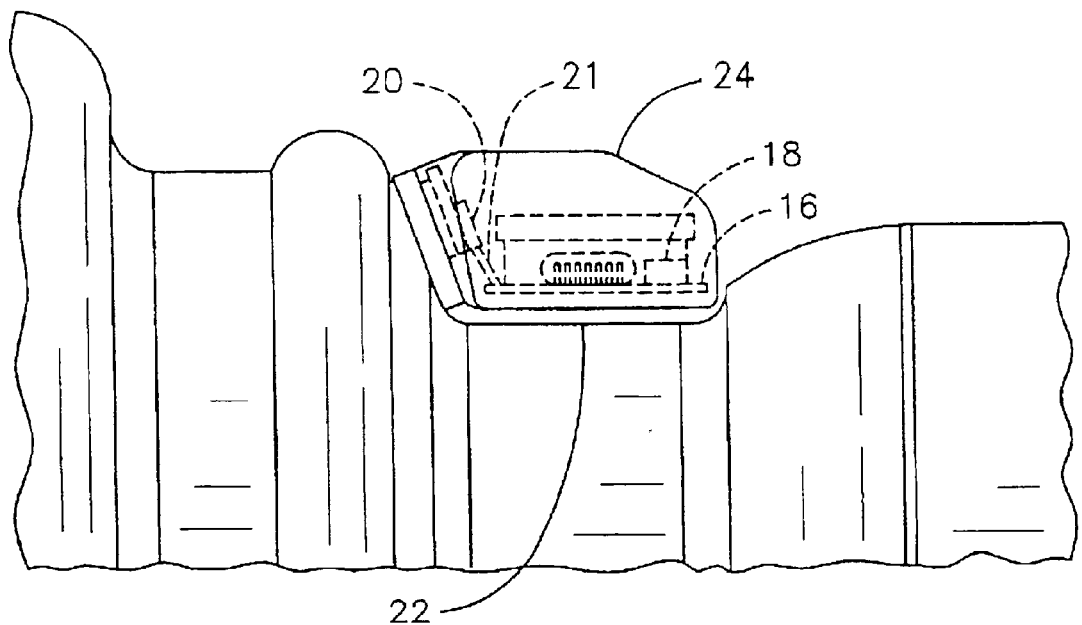
FIG. 6 illustrates a plan view of an exemplary tire pressure monitoring system that may be connectable to a valve stem of a tire and may benefit from circuits embodying aspects of the present invention.
Figure 7:
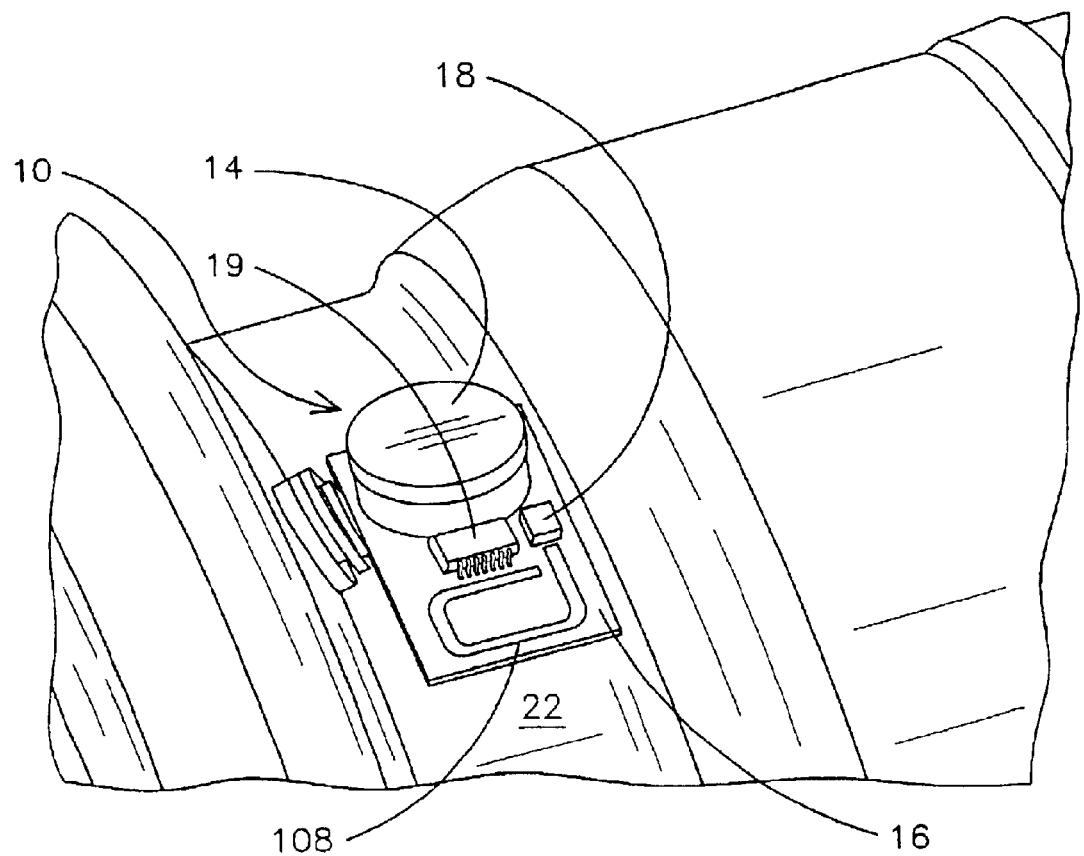
FIG. 7 illustrates an isometric view of the tire pressure monitoring system of FIG. 6.

FIG. 7 illustrates one exemplary configuration of a direct tire pressure monitoring system (TPMS) 10, such as may be used in mobile assets that use pneumatically inflatable tires. Examples of mobile assets may include cars, trucks, airplanes, industrial equipment, etc. The TPMS may include an integrated circuit (IC) chip 19 that may combine a pressure sensing device and a microprocessor. The TPMS may further include a power source 14, e.g., a battery, a printed circuit board (PCB) 16, and a transmitter 18. In one exemplary embodiment, PCB 16 may be made up of a relatively flat and hard board, which may include at one side thereof solder pads for connecting IC chip 19 and connections for a variety of electronic components, such as transmitter 18, and a transmitter antenna 108. Each side of the PCB may be configured with electrically conductive pathways between the components. In one exemplary configuration, PCB 16 may be electrically coupled through a connector 21 to a respective valve stem 20 of the tire (FIG. 6). As elaborated in further detail below, such an embodiment may be advantageous in applications that may use a direct electrical connection between the PCB and the metallic valve stem. This direct connection between the PCB and the valve stem provides a direct path to the microprocessor that may be used for training of the sensor relative to tire position (front left, front right, etc.), or providing any calibration that may be optionally desired. It will be appreciated that many other types of structures for electrically connecting the board to the valve stem will now be apparent to those skilled in the art.

The description provided so far is to facilitate understanding of an exemplary TPMS where circuits embodying aspects of the present invention may be utilized. It will be appreciated that utilization of the present invention is not limited to embodiments that provide a direct connection between the PCB and the valve stem.

Figure 1:
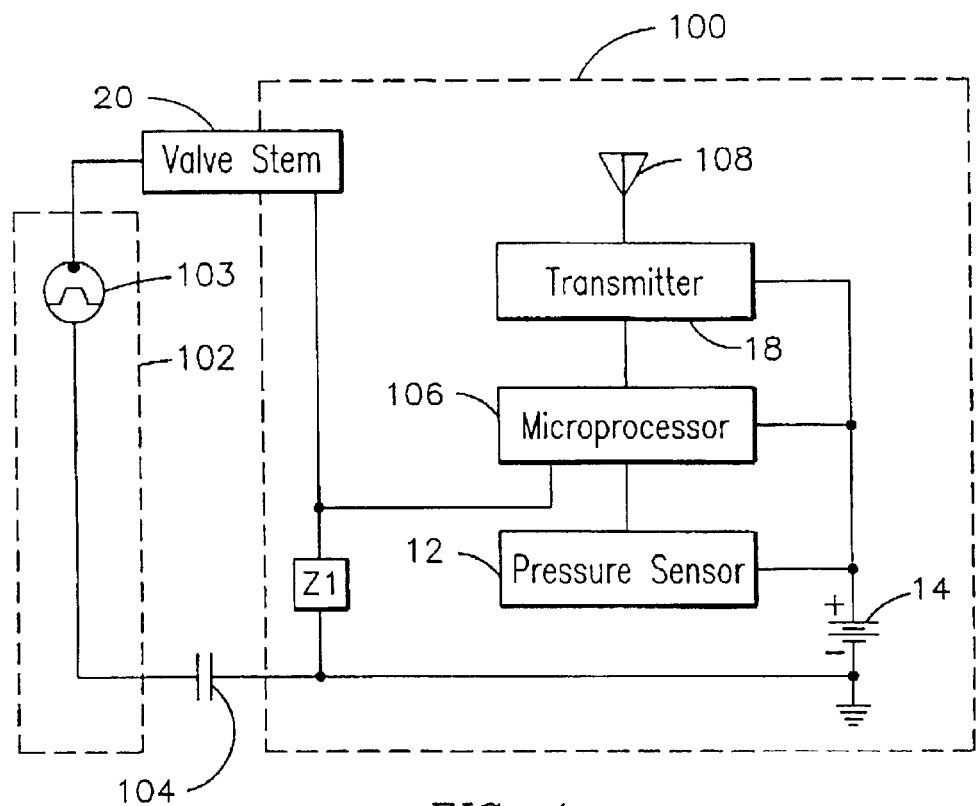
FIG. 1 illustrates schematic of a circuit embodying aspects of the present invention that allows communicating signals from an external device into a tire pressure monitoring system, such as exemplarily represented in FIGS. 6–7.

FIG. 1 illustrates a schematic of a circuit 100 embodying aspects of the present invention that allows communicating signals from an external device 102, such as a training device, a calibrating device, a testing device, etc., to the TPMS, even though the TPMS may just include a transmitter, and not a transceiver. Circuit 100 includes a means for providing capacitive coupling between the external device and the TPMS. In one exemplary embodiment, the means for providing such capacitive coupling comprises capacitance that may intrinsically develop between one of the lines for carrying/returning the DC voltage from the power source (e.g., the TPMS power line or the TPMS ground line) and an external ground (e.g. the wheel rim or the ground of the external device). Although the capacitive coupling means is illustrated in FIGS. 1 through 4 as a discrete capacitor 104, the inventors of the present invention have innovatively recognized that such a capacitor need not be a discrete capacitor, since, as suggested above, the capacitive coupling means could represent capacitance that intrinsically develops across two bodies, e.g., PC board 16 and the adjacent wheel rim 22 (FIG. 6). This allows for saving space and weight that otherwise would be taken by any discrete resistor. Exemplary SPICE simulations have shown that a coupling capacitance in the order of about two pF or more is sufficient to reliably and efficiently transfer signals, such as a stream of appropriately encoded pulses, from the external device to a microprocessor 106, part of the TPMS.

FIG. 1 further shows an impedance Z1 that may be chosen using techniques well-understood in the art for developing an appropriate voltage level in response to the stream of pulses supplied to the microprocessor from the external device. Impedance Z1 may be made up of resistive and/or reactive components, e.g., capacitance and/or inductance. As shown in FIG. 1, transmitter antenna 108 is directly connected to transmitter 18. In operation, upon making an electrical connection, e.g., through respective leads of the external device with the valve stem and the wheel rim, the external device would be capacitively coupled to pass information into the TPMS, e.g., microprocessor 106, without having to use a transceiver.

Figure 2:
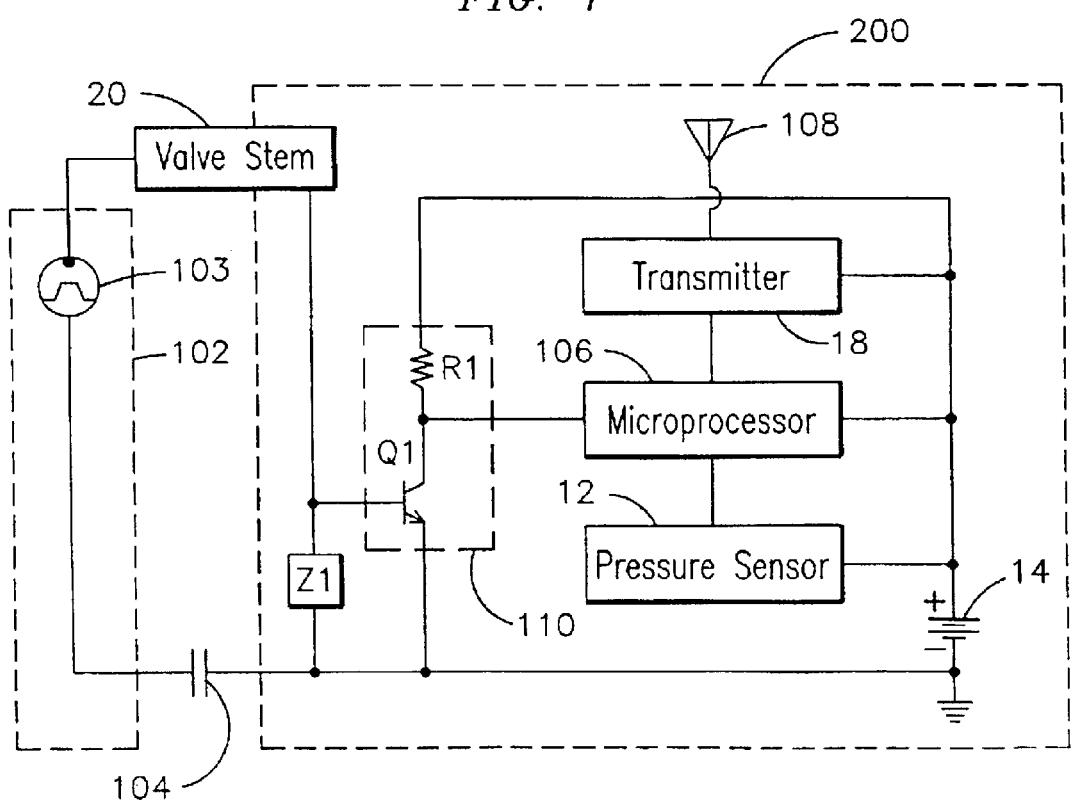
FIG. 2 illustrates a variation of the circuit of FIG. 1 that includes a buffer circuit.

FIG. 2 illustrates a variation of circuit 100 that includes a buffer circuit 110 that may be used in certain applications that may need signal level buffering relative to the input level requirements of the microprocessor.

Figure 3:
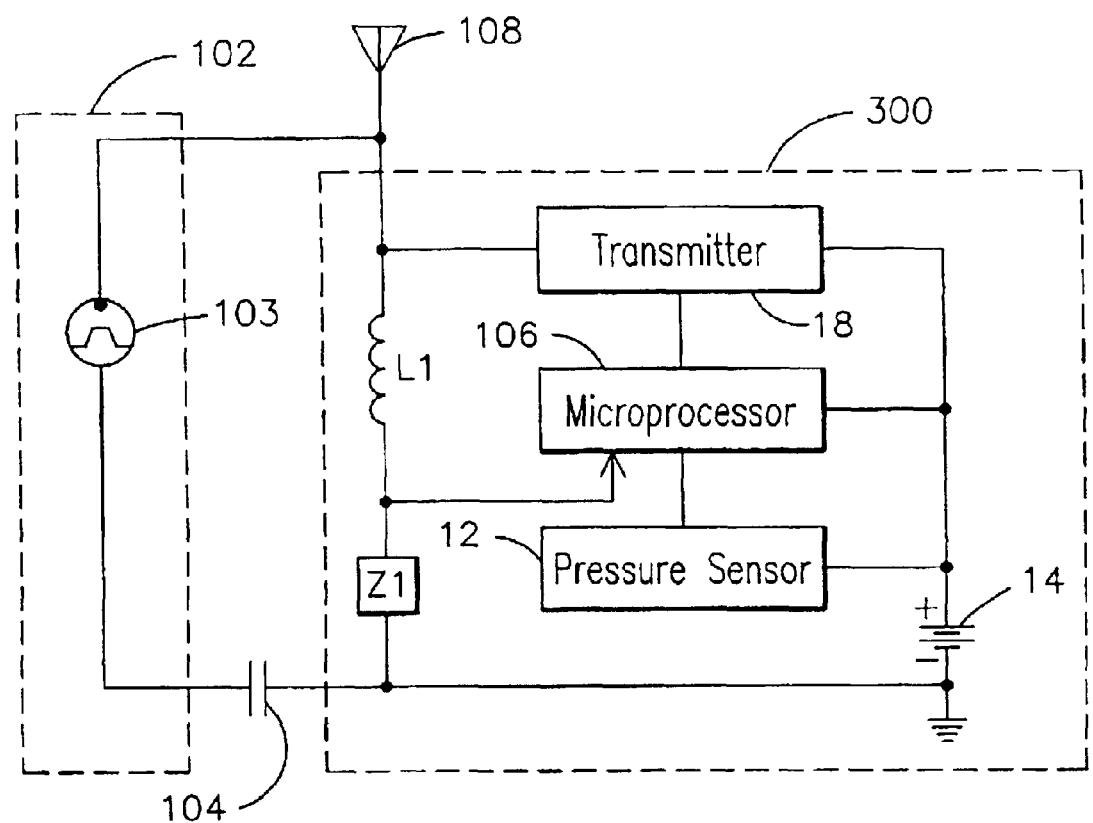
FIG. 3 illustrates schematic of a circuit embodying other aspects of the present invention that allows communicating signals from an external device into a tire pressure monitoring system that uses a valve stem as the transmitter antenna.

FIG. 3 illustrates one exemplary configuration of a direct tire pressure monitoring system (TPMS) 10 that uses the valve stem as the transmitter antenna. An inductor L1 may be used in circuit 300 to prevent the radio frequency signal from the transmitter from shorting to ground while allowing passage to the stream of pulses from the external device. As shown in FIG. 3, transmitter antenna 108 is shown as interconnected to impedance Z1 through inductor L1. As discussed in the context of FIGS. 1 and 2, it will be appreciated that in some applications antenna 108 could be solely connected to transmitter 18, in which case there would not be a need to provide inductor L1 since there would not be any path that could short to ground the RF signal from the transmitter. As suggested above, the exemplary circuit of FIG. 3 may be usable for applications where the TPMS uses the valve stem as the sensor transmitter antenna.

Figure 4:
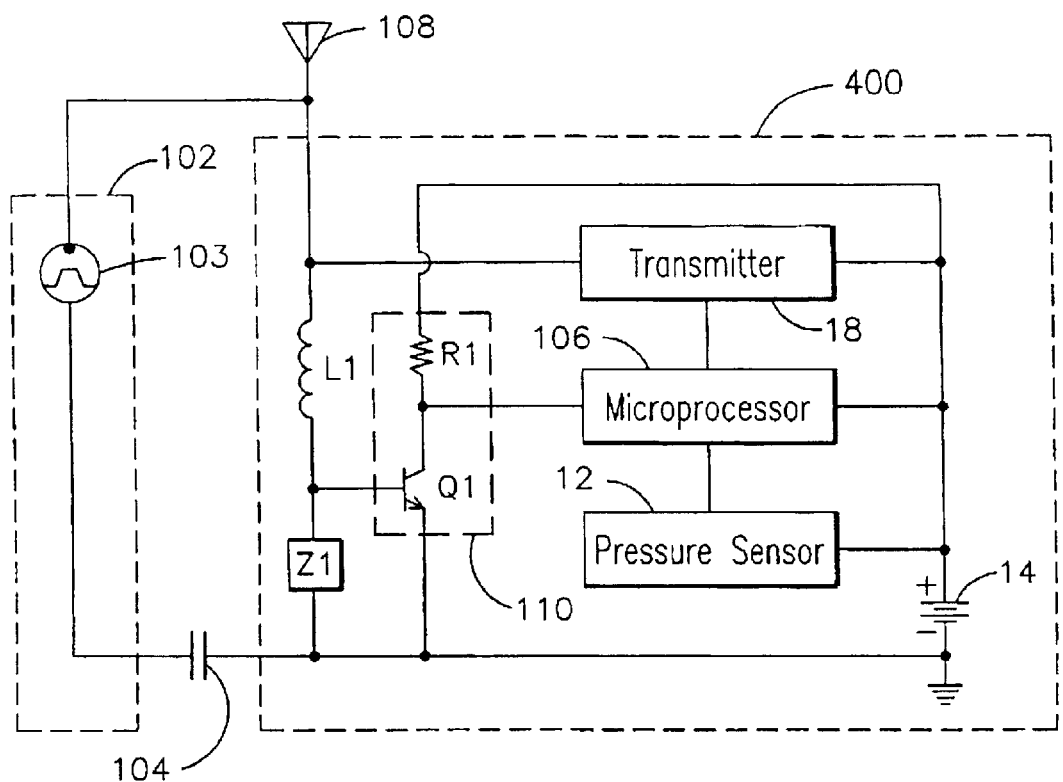
FIG. 4 illustrates a variation of the circuit of FIG. 3.

FIG. 4 illustrates a circuit 400, which is a variation of circuit 300 and includes a buffer circuit 110 that, as discussed in the context of FIG. 2, may be used in certain applications that may need signal level buffering relative to the input level requirements of the microprocessor.

Figure 5:
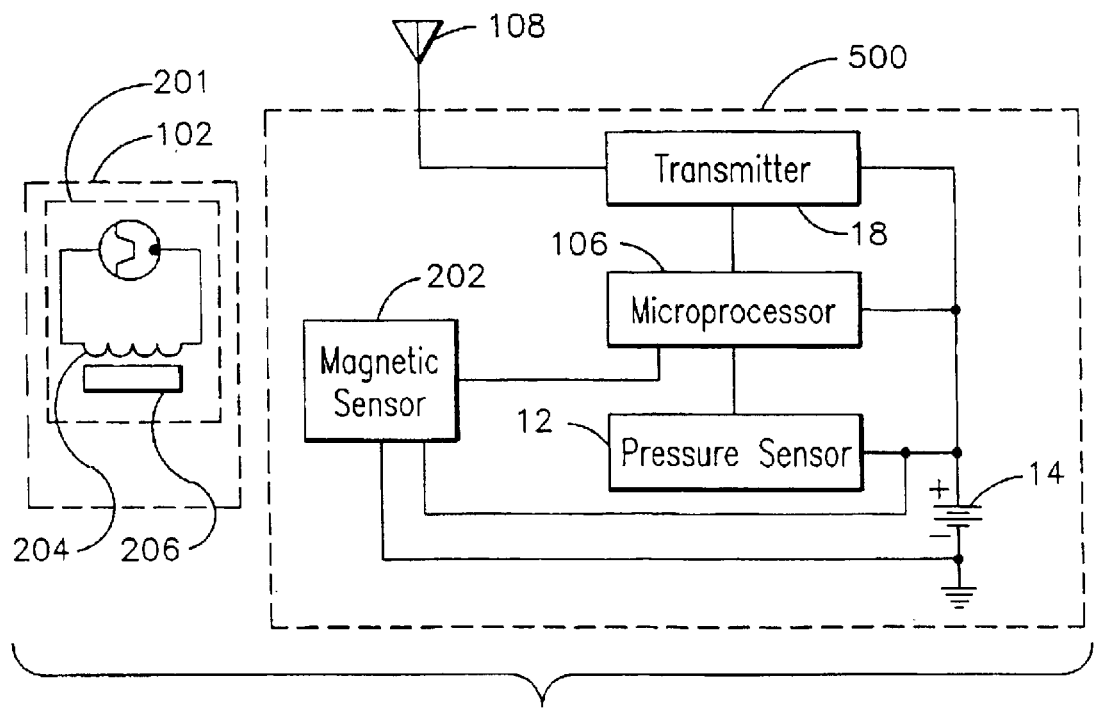
FIG. 5 illustrates an exemplary embodiment of a circuit that may be usable for electromagnetically communicating information from an external device into a tire pressure monitoring system in applications that need not use any direct contact with the valve stem or tire rim.

FIG. 5 illustrates an exemplary embodiment of a circuit 500 that may be usable for communicating information from the external device into the TPMS in applications that need not use any direct contact with the valve stem or tire rim. This circuit uses a standard magnetic sensor 202, such as a Hall or magnetoresistive sensor, to detect a magnetic field. As will be readily appreciated by those skilled in that art, the magnetic sensor converts magnetic field changes (e.g., magnetic field pulses) to voltage pulses. These voltage pulses can be read by microprocessor 106 to extract information from the external device. In this embodiment, the external device comprises an electromagnetic generator 201, such as may be made up of a coil 204 responsive to a pulse generator and electromagnetically coupled to a high permeability core 206. As will be readily understood by those skilled in the art, appropriately coded current pulses through the coil will generate correspondingly coded magnetic field pulses. When the electromagnetic generator 201 is placed proximate to the magnetic field sensor 202, the magnetic field pulses from the external device are converted by the magnetic sensor to voltage pulses, which are then read by microprocessor 106.

While the preferred embodiments of the present invention have been shown and described herein, it will be obvious that such embodiments are provided by way of skill in the art without departing from the invention herein. Accordingly, it is intended that the invention be limited onky by the spirit and scope of the appended claims.

What is claimed is:

1. A tire pressure monitoring system connectable to a valve stem for supplying air to a respective tire, the system comprising:
   a pressure sensing device;
   a printed circuit board;
   a microprocessor mounted on the printed circuit board and electrically coupled to the pressure sensing device;
   a connector for electrically connecting the printed circuit board to a respective valve stem end disposed within the tire;
   a circuit providing capacitive coupling to pass an externally-derived stream of pulses to the microprocessor upon connecting an external device that generates the stream of externally-derived pulses to the valve stem, the stream of pulses carrying information usable by the microprocessor to perform a respective operational function.

2. The system of claim 1 wherein the circuit comprises capacitance intrinsically developed between the printed circuit board and a rim that supports the respective tire to provide the capacitive coupling for passing the externally-derived stream of pulses.

3. The system of claim 1 wherein the circuit comprises a capacitor to provide the capacitive coupling for passing the externally-derived stream of pulses.

4. The system of claim 2 further comprising an impedance for receiving the stream of pulses and developing across said impedance a desired pulse amplitude level.

5. The system of claim 4 further comprising a buffer circuit coupled to receive the stream of pulses and provide pulse amplitude matching relative to the input level requirements of the microprocessor.

6. A method for coupling signals to a tire pressure monitoring system connectable to a valve stem for supplying air to a respective tire, the method comprising:
   providing a pressure sensing device;
   providing a microprocessor mounted on a printed circuit board;
   electrically connecting the printed circuit board to a respective valve stem end disposed within the tire;
   providing capacitive coupling to pass an externally-derived stream of pulses to the microprocessor upon connecting an external device that generates the stream of externally-derived pulses to the valve stem and an electrical ground, the stream of pulses carrying information usable by the microprocessor to perform a respective operational function.

7. The method of claim 6 further comprising using capacitance intrinsically developed between the printed circuit board and a rim that supports the respective tire to provide the capacitive coupling for passing the externally-derived stream of pulses.

8. The method of claim 6 further comprising using a capacitor to provide the capacitive coupling for passing the externally-derived stream of pulses.

9. The method of claim 7 further comprising providing an impedance for receiving the stream of pulses and developing across said impedance a desired pulse amplitude level.

10. The method of claim 9 further comprising providing pulse amplitude matching relative to the input level requirements of the microprocessor.

11. A tire pressure monitoring system assembled within the interior of a tire and comprising:
    a pressure sensing device;
    a microprocessor electrically coupled to the pressure sensing device;
    a circuit comprising a magnetic sensor selected from the group consisting of Hall and magnetoresistive sensors and configured to provide electromagnetic coupling to pass an externally-derived stream of pulses to the microprocessor upon an external device that generates the stream of externally-derived of pulses being placed proximate the circuit providing the electromagnetic coupling, the stream of pulses carrying information usable by the microprocessor to perform a respective operational function.

12. The system of claim 11 wherein the respective operational function is selected from the group consisting of testing, calibrating and training tire location of the pressure sensing device.

13. A method for coupling signals to tire pressure monitoring system assembled within the interior of a tire, the method comprising:
    providing a pressure sensing device;
    electrically coupling a microprocessor to the pressure sensing device;
    providing electromagnetic coupling by way of a magnetic sensor selected from the group consisting of Hall and magnetoresistive sensors and configured to pass an externally-derived stream of pulses to the microprocessor upon an external device that generates the stream of externally-derived of pulses being placed proximate the sensor, the stream of pulses carrying information usable by the microprocessor to perform a respective operational function.

14. A circuit for coupling signals to a tire pressure monitoring system assembled within the interior of a tire, the circuit comprising:
    a coupling circuit providing capacitive coupling to pass an externally-derived stream of pulses to a microprocessor therein upon connecting respective leads from an external device that generates the stream of externally-derived of pulses to a valve stem of the tire and an electrical ground, the stream of pulses carrying information usable by the microprocessor to perform a respective operational function.

15. The circuit of claim 14 wherein the coupling circuit comprises capacitance intrinsically developed between a printed circuit board and a rim that supports the respective tire to provide the capacitive coupling for passing the externally-derived stream of pulses.

16. The circuit of the claim 14 wherein the circuit comprises a capacitor to provide the capacitive coupling for passing the externally-derived stream of pulses.

17. The circuit of claim 15 further comprising an impedance for receiving the stream of pulses and developing across said impedance a desired pulse amplitude level.

18. The circuit of claim 17 further comprising a buffer circuit coupled to receive the stream of pulses and provide pulse amplitude matching relative to the input level requirements of the microprocessor.

19. The circuit of claim 17 further comprising an inductor coupled between the impedance and the valve stem wherein the valve stem constitutes a transmitter antenna and the inductor is selected to prevent an electrical signal to be radiated from the valve stem from being electrically shorted to ground while enabling a path for the stream of externally-derived pulses.

20. A circuit for coupling signals to a tire pressure monitoring system assembled within the interior of a tire, the circuit comprising:

a coupling circuit comprising a magnetic sensor selected from the group consisting of Hall and magnetoresistive sensors and configured to provide electromagnetic coupling to pass an externally-derived stream of pulses to a microprocessor therein upon an external device that generates the stream of externally-derived of pulses being placed proximate the coupling circuit, the stream of pulses carrying information usable by the microprocessor to perform a respective operational function.

21. A tire pressure monitoring system connectable to a valve stem for supplying air to a respective tire, the system comprising:

a pressure sensing device;

a printed circuit board;

a microprocessor mounted on the printed circuit board and electrically coupled to the pressure sensing device;

a connector for electrically connecting the printed circuit board to a respective valve stem end disposed within the tire, wherein the valve stem receives at least one electrical signal indicative of the level of pressure sensed by the pressure sensing device and radiates said electrical signal to the surrounding environment;

a circuit providing capacitive coupling to pass an externally-derived stream of pulses to the microprocessor upon connecting respective leads from an external device that generates the stream of externally-derived pulses to the valve stem and an electrical ground therein, the stream of pulses carrying information usable by the microprocessor to perform a respective operational function.

22. The system of claim 21 wherein the circuit comprises capacitance intrinsically developed between the printed circuit board and a rim that supports the respective tire to provide the capacitive coupling for passing the externally-derived stream of pulses.

23. The system of claim 21 wherein the circuit comprises a capacitor to provide the capacitive coupling for passing the externally-derived stream of pulses.

24. The system of claim 22 further comprising an impedance for receiving the stream of pulses and developing across said impedance a desired pulse amplitude level.

25. The system of claim 24 further comprising a buffer circuit coupled to receive the stream of pulses and provide pulse amplitude matching relative to the input level requirements of the microprocessor.

26. The system of claim 24 further comprising an inductor coupled between the impedance and the valve stem wherein the valve stem constitutes a transmitter antenna and the inductor is selected to prevent the electrical signal to be radiated from the valve stem from being electrically shorted to ground while enabling a path for the stream of externally-derived pulses.

27. A method for coupling signals to a tire pressure monitoring system connectable to a valve stem for supplying air to a respective tire, the method comprising:

providing a pressure sensing device;

providing a microprocessor mounted on a printed circuit board;

electrically connecting the printed circuit board to a respective valve stem end disposed within the tire, receiving through the valve stem at least one electrical signal indicative of the level of pressure sensed by the pressure sensing device and radiating said electrical signal to the surrounding environment;

providing capacitive coupling to pass an externally-derived stream of pulses to the microprocessor upon connecting an external device that generates the stream of externally-derived pulses to the valve stem and an electrical ground, the stream of pulses carrying information usable by the microprocessor to perform a respective operational function.

28. The method of claim 27 further of comprising using capacitance intrinsically developed between the printed circuit board and a rim that supports the respective tire to provide the capacitive coupling for passing the externally-derived stream of pulses.

29. The method of claim 27 further comprising using a capacitor to provide the capacitive coupling for passing the externally-derived stream of pulses.

30. The method of claim 28 further comprising providing an impedance for receiving the stream of pulses and developing across said impedance a desired pulse amplitude level.

31. The method of claim 30 further comprising providing pulse amplitude matching relative to the input level requirements of the microprocessor.

32. The method of claim 30 comprising coupling an inductor between the impedance and the valve stem wherein the valve stem constitutes a transmitter antenna and the inductor is selected to prevent the electrical signal to be radiated from the valve stem from being electrically shorted to ground while enabling a path for the stream of externally-derived pulses.

* * * * *